(12) United States Patent
Yu et al.

(10) Patent No.: US 8,032,720 B2
(45) Date of Patent: Oct. 4, 2011

(54) MEMORY ACCESS MONITORING APPARATUS AND RELATED METHOD

(75) Inventors: Ching-Yeh Yu, Taipei (TW); Yen-Ju Lu, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 580 days.

(21) Appl. No.: 12/208,347

(22) Filed: Sep. 11, 2008

(65) Prior Publication Data

US 2009/0070534 A1 Mar. 12, 2009

(30) Foreign Application Priority Data

Sep. 11, 2007 (TW) ................................ 96133865 A (51) Int. Cl.
*G06F 12/00* (2006.01)
(52) U.S. Cl. .................... 711/154; 711/156; 711/163
(58) Field of Classification Search ................ None
See application file for complete search history.

(56) References Cited

U.S. PATENT DOCUMENTS

| | | | | |
|---|---|---|---|---|
| 7,013,362 | B1* | 3/2006 | Ervin | 711/2 |
| 7,823,019 | B2* | 10/2010 | Piry et al. | 714/35 |
| 2002/0174312 | A1 | 11/2002 | Ikeda | |
| 2007/0079177 | A1* | 4/2007 | Spirakis et al. | 714/34 |
| 2008/0256339 | A1* | 10/2008 | Xu et al. | 712/216 |
| 2008/0294868 | A1* | 11/2008 | Rozas et al. | 711/207 |
| 2009/0320001 | A1* | 12/2009 | Bates et al. | 717/129 |

FOREIGN PATENT DOCUMENTS

| | | |
|---|---|---|
| CN | 1388928 A | 1/2003 |
| TW | 465234 | 11/2001 |
| TW | 512583 | 12/2002 |
| TW | I239527 | 9/2005 |
| TW | 200702729 | 1/2007 |

* cited by examiner

*Primary Examiner* — John Lane
(74) *Attorney, Agent, or Firm* — Winston Hsu; Scott Margo (57) ABSTRACT

A memory access controlling apparatus, for monitoring an access of a memory to generate a target watch signal, includes: at least one monitoring circuit, a setting unit and an output circuit. The monitoring circuit corresponds to an address of the memory and holds an access setting value. The monitoring circuit monitors the access of the memory according to the access setting value to generate an initial watch signal. The setting unit holds a setting value for triggering an exception, which is related to a condition for triggering the exception while the memory is accessed. The output circuit is coupled to the monitoring circuit and the setting unit, and is used for generating the target watch signal according to the initial watch signal and the setting value.

18 Claims, 7 Drawing Sheets

| MATCH | 0 | 1 | 0 | 1 |
| --- | --- | --- | --- | --- |
| GI | 0 | 0 | 1 | 1 |
| XCPN | 0 | 1 | 1 | 0 |

| | RANGE4 | RANGE1 I | RANGE5 | RANGE2 RW | RANGE6 | RANGE3 R | RANGE7 |
|---|---|---|---|---|---|---|---|
| MATCH_1 | 0 | 0 | 0 | 0 | 0 | 0 | 0 |
| MATCH_2 | 0 | 0 | 0 | 1 | 0 | 0 | 0 |
| MATCH_3 | 0 | 0 | 0 | 0 | 0 | 1 | 0 |
| XOR | 0 | 0 | 0 | 1 | 0 | 1 | 0 |
| XCPN(GI=0) | 0 | 0 | 1 | 1 | 1 | 1 | 0 |
| XCPN(GI=1) | 1 | 1 | 1 | 0 | 1 | 0 | 1 |

MEMORY ACCESS MONITORING APPARATUS AND RELATED METHOD

BACKGROUND OF THE INVENTION

1. Field of the Invention

The present invention relates to memory access, and more particularly, to an apparatus for monitoring a processor to access a memory and method thereof.

2. Description of the Prior Art

In general, a processor, for example, a central processing unit, not only can execute instructions but can also provide a function of monitoring memory access. The function of monitoring is used to determine an allowable pre-set range in the memory for access or an allowable operation in the memory for detecting abnormal access. This provides an advantage when debugging or preventing an incorrect program from affecting the system operation.

There are two common memory-access controlling methods in the conventional art. One memory access controlling method uses several watch registers in the processor for registering the status of one or more monitored ranges and operations in the memory, such as data-read, data-write or instruction-execution. If the status of the ranges and operations accessed by the processor both conform to the allowable ranges and allowable operations, a watch-point exception signal (i.e., exception signal) is generated and an exception handler is triggered by the watch-point exception signal to have the processor process the exception event in a predetermined way. This kind of memory access controlling method is adopted in the MIPS processor. The other common memory access controlling in the memory method also registers the status of one or more monitored ranges and operations for the memory. The difference with the above controlling method, however, is the condition for triggering the exception handler. Unlike the MIPS processor system, the exception handler is triggered under the condition that either the memory ranges accessed by the processor are not within the predetermined range stored in the registers, or the operations accessed by the processor do not conform to the predetermined operations. For example, an exception signal would be generated under the condition of writing to a read-only memory range. This kind of memory access controlling method is adopted in the ARM processor.

As both the above-mentioned memory access controlling methods have distinct criteria, the controlling method cannot be selected according to user requirements.

SUMMARY OF THE INVENTION

It is therefore one of the objectives of the present invention to provide a memory access controlling apparatus and a method thereof, which provide the user with a different way to control the memory access in order to solve the above-mentioned problem.

According to an exemplary embodiment of the present invention, a memory access controlling apparatus for monitoring an access of a memory to generate a target watch signal is disclosed. The memory access controlling apparatus comprises: at least one monitoring circuit, a setting unit and an output circuit. The monitoring circuit corresponds to an address of the memory and holds an access setting value. The monitoring circuit monitors the access of the memory according to the access setting value to generate an initial watch signal. The setting unit holds a setting value for triggering an exception, which is related to a condition for triggering the exception while the memory is accessed. The output circuit is coupled to the monitoring circuit and the setting unit, and is used for generating the target watch signal according to the initial watch signal and the setting value.

According to an exemplary embodiment of the present invention, a memory access controlling method for monitoring an access of a memory to generate a target watch signal is disclosed. The method comprises: monitoring an operation of a processor accessing the memory according to an access setting value to generate an initial watch signal; providing a setting value for triggering an exception, which is related to a condition for triggering the exception while the memory is accessed; and generating the target watch signal according to the initial watch signal and the setting value.

According to an exemplary embodiment of the present invention, another memory access controlling apparatus for monitoring an access of a memory to generate a watch signal is also disclosed. The memory access controlling apparatus comprises a monitoring unit, a mode setting unit and an output unit. The monitoring unit comprises: at least one monitor, holding an access setting value, for monitoring the access of the memory according to the access setting value to generate a watch signal; and a processing circuit, coupled to the monitor, for performing a logic operation on the watch signal to generate an operation signal. The mode setting unit holds an exception setting value, which is set according to a condition for triggering an exception while the memory is accessed. The output unit is coupled to the monitoring unit and the mode setting unit, and is used for generating the watch signal according to the operation signal and the exception setting value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
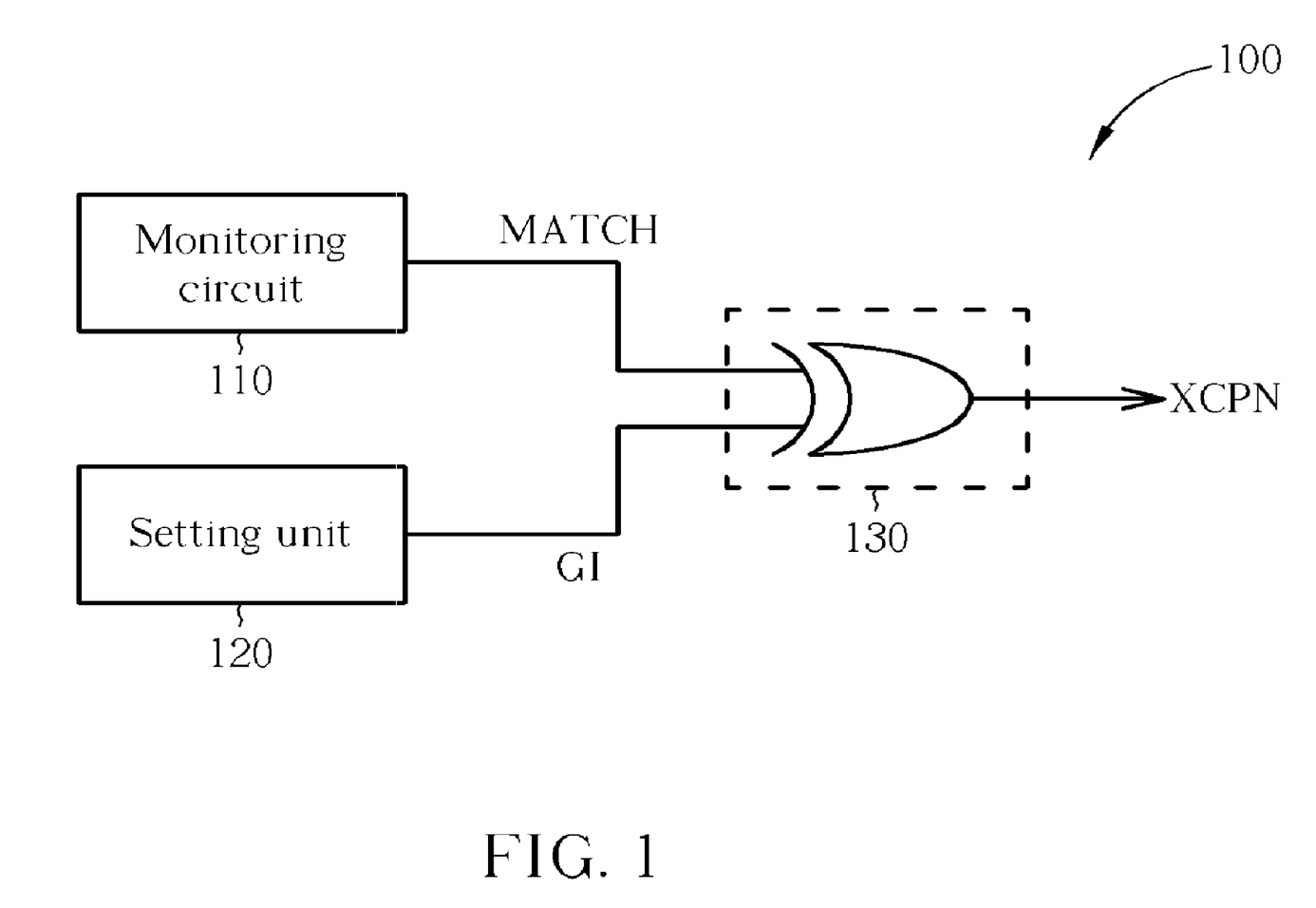
FIG. 1 is a block diagram illustrating a memory access controlling apparatus according to an exemplary embodiment of the present invention.
Figure 2:
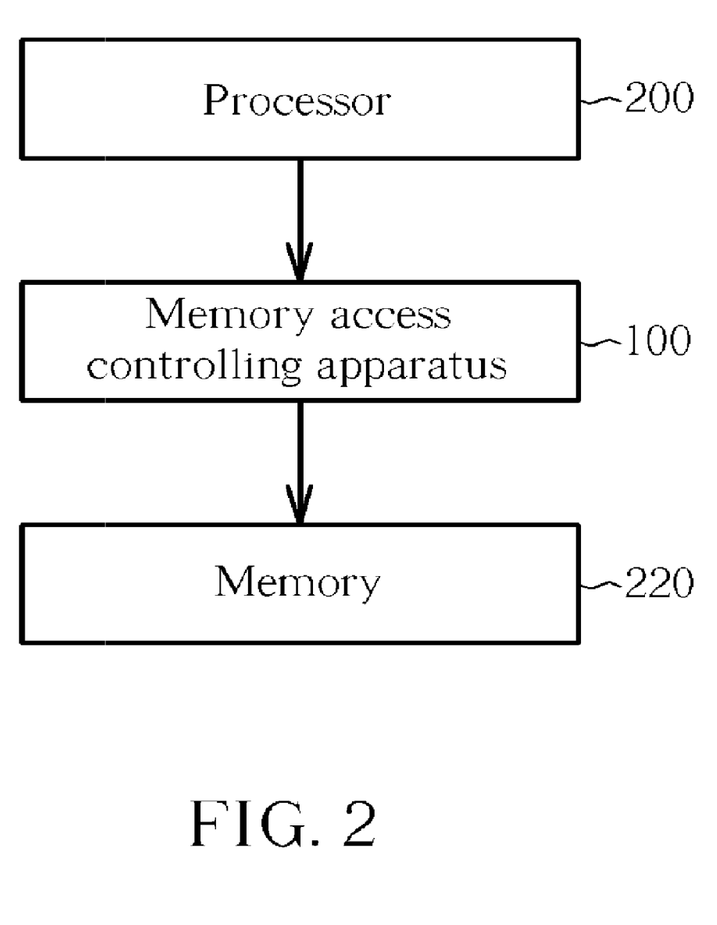
FIG. 2 is a block diagram illustrating the memory access controlling apparatus in FIG. 1 monitoring a processor accessing a memory.

Please refer to FIG. 1 with reference to FIG. 2. FIG. 1 is a block diagram illustrating a memory access controlling apparatus 100 according to an exemplary embodiment of the present invention. FIG. 2 is a block diagram illustrating the memory access controlling apparatus 100 monitoring a processor 200 accessing a memory 220. The memory access controlling apparatus 100 is used for monitoring an operation of the processor 200 accessing the memory 220 and generates a target watch result XCPN. As shown in FIG. 1, the memory access controlling apparatus 100 comprises a monitoring circuit 110, a setting unit 120 and an output circuit 130. The monitoring circuit 110 corresponds to an address of the memory 220 and comprises at least one watch register, which is used for storing an access setting value. The monitoring circuit 110 monitors the operation of the processor 200 accessing the memory 220 according to the access setting value to generate an initial watch result MATCH. The setting unit 120 holds a setting value for triggering the exception GI, which is related to a condition for triggering an exception while the memory is accessed. The output circuit 130 is coupled to the monitoring circuit 110 and the setting unit 120, and is used for generating the target watch result XCPN according to the initial watch result MATCH and the setting value for triggering the exception GI. Further description of the operation of the memory access controlling apparatus 100 is detailed below. This is merely for illustrative purposes, however, and is not meant to be a limitation of the present invention.

Figure 3:
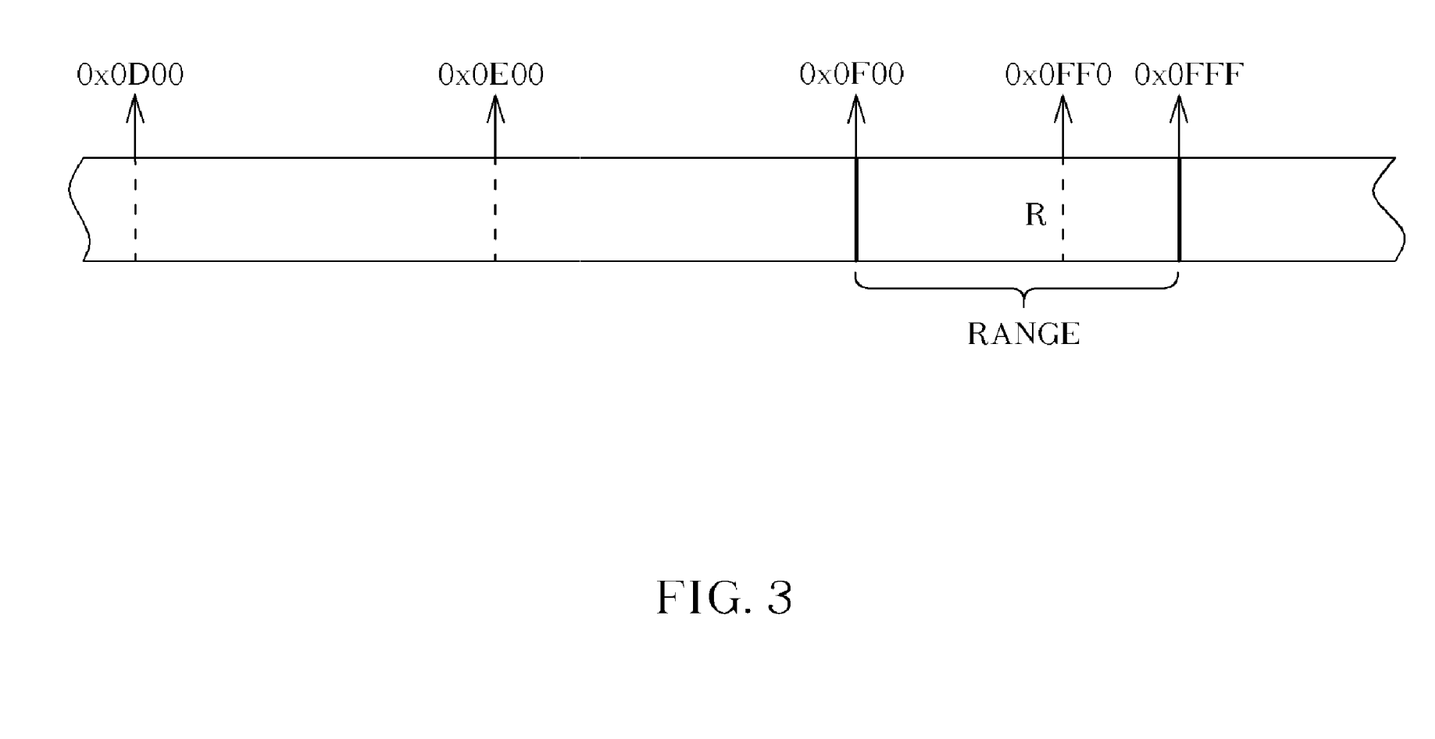
FIG. 3 is a diagram illustrating an exemplary access setting value for the memory access controlling apparatus in FIG. 1.

In one embodiment, the aforementioned access setting value comprises a specific memory range for the memory 220 and a specific access operation corresponding to the specific memory range. The specific access operation comprises data read (R), data write (W), instruction execution (I) or any combination thereof. Please refer to FIG. 3. FIG. 3 is a diagram illustrating an exemplary access setting value, as an example of the operation. In this embodiment, the access setting value stored in the monitoring circuit 110 is determined in order to allow the processor 200 to perform a data read (R) on the memory 220 with the specific memory range RANGE of 0x0F00-0x0FFF. Under this circumstance, if the processor 200 performs a data read (R) on any memory unit in the specific memory range RANGE, for example, if the processor 200 performs a data read (R) on the memory units from 0x0F00 to 0x0FFF, the monitoring circuit 110 will output a high logic level "1" as the initial watch result MATCH. The high logic level "1" means that the operation of the processor 200 conforms to the access setting value for the memory 220. If the processor 200 performs any operation except data read on the memory in the specific memory range RANGE, for example, if the processor 200 performs a data write (W) on the memory unit 0x0FF0, the monitoring circuit 110 will output a low logic level "0" as the initial watch result MATCH. The low logic level "0" means that the operation of the processor 200 does not conform to the access setting value for the memory 220. If the processor 200 performs any operation, such as data read, data write or instruction execution on the memory units out of the specific memory range RANGE, for example, if the processor 200 performs a data write (W) on any memory unit from 0x0D00 to 0x0E00, the monitoring circuit 110 will output a low logic level "0" as the initial watch result MATCH. The low logic level "0" means that the watching circuit 110 is not used to monitor the memory range from 0x0D00 to 0x0E00. Please note that the first logic value is a high logic level "1" and the second logic value is a low logic level "0"; these are only for illustrative purposes, however, and not limitations of the present invention.

Figure 4:
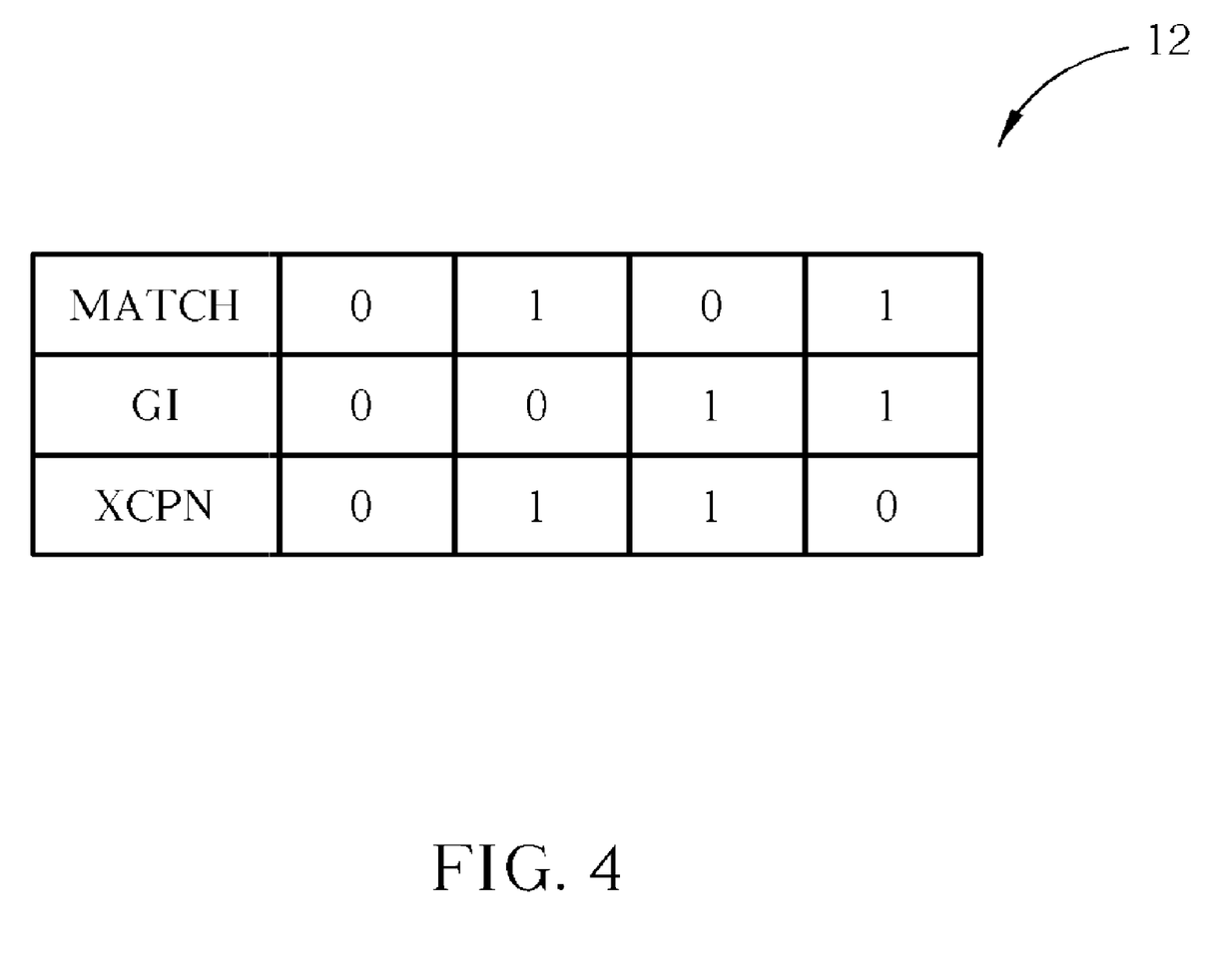
FIG. 4 is a truth table for the logic values of the memory access controlling apparatus in FIG. 1.

In one embodiment, the output circuit 130 is a logic circuit and outputs the target watch result XCPN by performing a predetermined logic operation on the initial watch result MATCH and the setting value for triggering the exception GI. In this embodiment, the predetermined logic operation is an XOR logic operation, and the output circuit 130 is implemented with the XOR logic gate. As shown in FIG. 4, the setting value for triggering the exception GI is at a low logic level "0" if the target watch result XCPN generated from the output circuit 130 is the same as the initial watch result MATCH outputted from the monitoring circuit 110. On the other hand, the setting value for triggering the exception GI is at a high logic level "1" if the target watch result XCPN generated from the output circuit 130 is opposite to the initial watch result MATCH outputted from the monitoring circuit 110. In the above embodiment, the initial watch result MATCH being at a high logic level "1" means that the memory access conforms to the access setting value. Therefore, if it is required to trigger the exception when the memory access operation of the processor 200 conforms to the access setting value, the setting value for triggering the exception GI can be set to be "0". This kind of memory access controlling method is often used in the MIPS microprocessor. On the contrary, if triggering an exception when the memory access operation of the processor 200 does not conform to the access setting value, the setting value for triggering the exception GI can be set to be "1". This kind of memory access controlling method is often used in the ARM microprocessor as memory protection. In brief, the memory access controlling method can be selected easily by changing the setting value for triggering the exception GI.

The above embodiment is only for illustrative purposes and is not a limitation of the present invention. Other predetermined logic operations and corresponding output circuits capable of controlling the target watch result XCPN according to the setting value for triggering the exception GI in order to achieve the objective of allowing the user to select the memory access controlling method also obey the spirit of the present invention.

Figure 5:
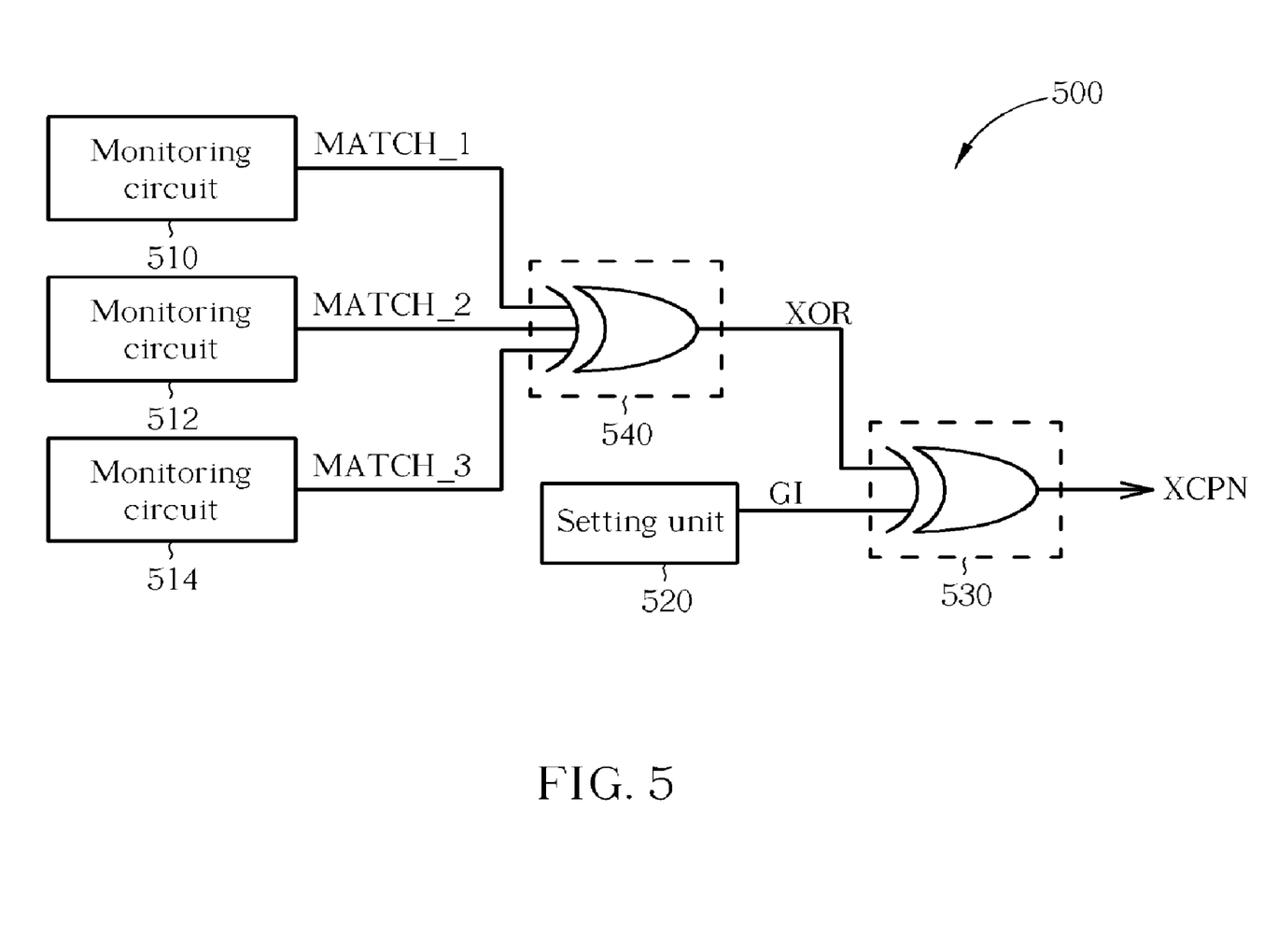
FIG. 5 is a block diagram illustrating a memory access controlling apparatus according to another exemplary embodiment of the present invention.

Please refer to FIG. 2 and FIG. 5 together. FIG. 5 is a block diagram illustrating a memory access controlling apparatus 500 according to another exemplary embodiment of the present invention. The memory access controlling apparatus 500 is used for monitoring an operation of the processor 200 in FIG. 2 accessing the memory 220 and generates a target watch result XCPN. As shown in FIG. 5, the memory access controlling apparatus 500 comprises a plurality of monitoring circuits 510, 512 and 514, a processing circuit 540, a setting unit 520 and an output circuit 530. The monitoring circuits 510, 512 and 514 respectively comprise at least one watch register, which is used for storing an access setting value. The monitoring circuits 510, 512 and 514 monitor the operation of the processor 200 accessing the memory 220 according to the respective access setting values to generate a plurality of initial watch results MATCH_1, MATCH_2 and MATCH_3 to the processing circuit 540. The processing circuit 540 is coupled to the monitoring circuits 510, 512, 514 and the output circuit 530, and is used for performing a predetermined logic operation (e.g., XOR operation) on the plurality of initial watching results MATCH_1, MATCH_2 and MATCH_3 to generate a operation result XOR then output the operation result XOR to the output circuit 530. The setting unit 520 holds a setting value for triggering the exception GI, which is related to a condition for triggering an exception while the memory is accessed. The output circuit 530 is coupled to the processing circuit 540 and the setting unit 520, and is used for generating the target watch result XCPN according to the operation result XOR and the setting value for triggering the exception GI. As operations and functions of the memory access controlling apparatus 500 shown in FIG. 5 are similar to elements with the same name in the memory access controlling apparatus 100 in FIG. 1, further descriptions are not detailed here for the sake of brevity.

Figure 6:
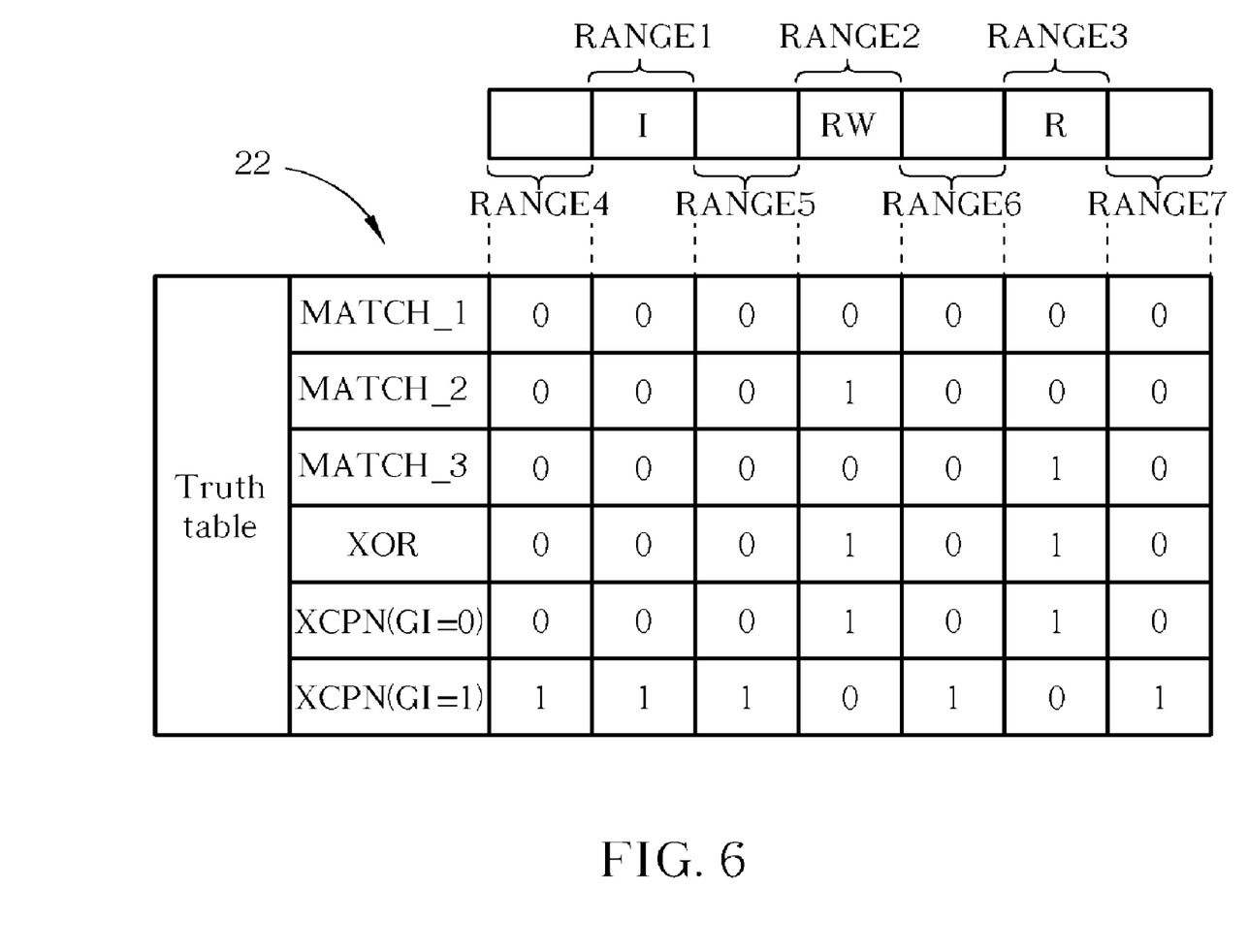
FIG. 6 is a diagram illustrating an exemplary operation of the memory access controlling apparatus in FIG. 5.

Please refer to FIG. 6. FIG. 6 is a diagram illustrating an exemplary operation of the memory access controlling apparatus 500 in FIG. 5. In this embodiment, a first access setting value stored in the monitoring circuit 510 is determined to allow performing an instruction execution (I) on the memory 220 with a first specific memory range RANGE1; a second access setting value stored in the monitoring circuit 512 is determined to allow performing a data read or data write (RW) on the memory 220 with a second specific memory range RANGE2; and a third access setting value stored in the monitoring circuit 514 is determined to allow performing a data read (R) on the memory 220 with a third specific memory range RANGE3. Briefly speaking, the monitoring circuits 510, 512, 514 only monitor the specific memory ranges RANGE1-RANGE3 respectively, and generate the corresponding initial watching results MATCH_1, MATCH_2, MATCH_3.

Since there is no access setting value for specific memory ranges RANGE4-RANGE7 of the memory 220, the output from the monitoring circuits 510, 512 and 514 are zeros to represent no result (they show "0" for RANGE4-RANGE7 in the truth table of FIG. 6). Before the processor 200 accesses the memory 220, it will send the memory address to be accessed to the memory access controlling apparatus 500. All the monitoring circuits 510, 512 and 514 receive data concerning the memory address of the memory 220 to be accessed by the processor 200. Then, the monitoring circuits 510, 512 and 514 monitor whether the operation of the processor 200 accessing the memory 220 conforms to the respective access setting value according to the data. For example, it is checked whether the memory range being accessed belongs to the specific memory range, and checked whether the access operation conforms to the access setting value. If both of the conditions are met, the monitoring circuits 510, 512 and 514 will output a high logic level "1" as their initial watch results. If the condition that the access operation conforms to the access setting value is not met, the monitoring circuits 510, 512 and 514 will output a low logic level "0" as their initial watch results. If the condition that the memory range being accessed belongs to the specific memory range is not met, the monitoring circuits 510, 512 and 514 will output a low logic level "0" as their initial watch results. In addition, the memory controlling method can be selected by changing the setting value for triggering the exception GI. In this embodiment, there are at least two kinds of memory access controlling methods. One is generating an exception signal when both the range and operation conform to the access setting value, and the other is generating an exception signal when either one of the range or operation does not conform to the access setting value. The related operation of the memory access controlling apparatus 500 is shown in a truth table 22 in FIG. 6. The truth table 22 illustrates the logic values of the initial watching results MATCH_1, MATCH_2, MATCH_3, the operation result XOR and the target watch result XCPN when the processor 200 performs a data read on the memory 220 with the specific memory ranges RANGE1-RANGE7. After reading the above-mentioned description, the truth table 22 should be readily appreciated by those skilled in the art, so further description is omitted here for the sake of brevity.

Figure 7:
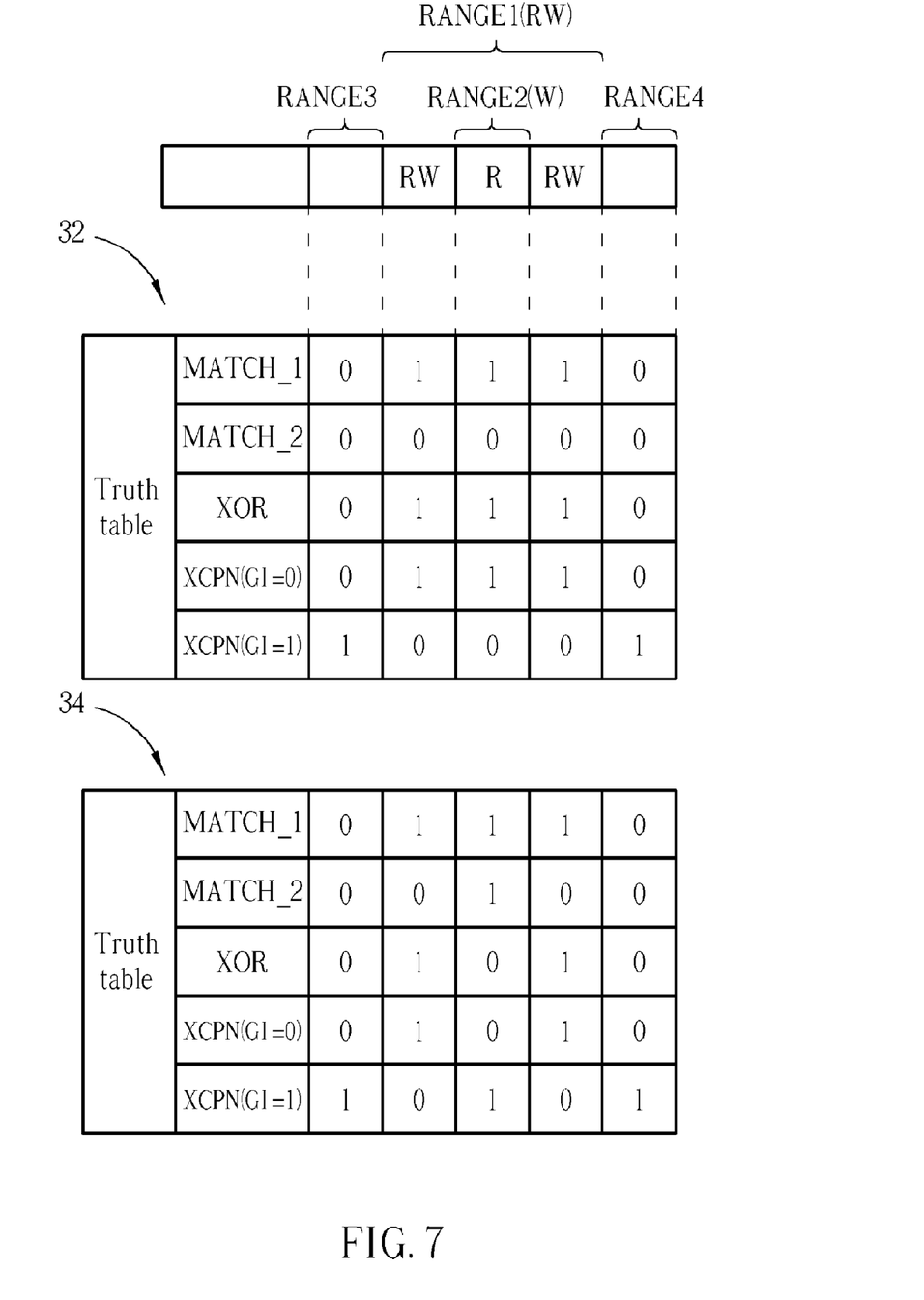
FIG. 7 is a diagram illustrating an exemplary operation of the memory access controlling apparatus in FIG. 5, whose access setting value has overlapping memory ranges.

In one preferable embodiment, the specific memory ranges in separate access setting value can overlap in the memory access controlling apparatus 500. In other words, a first specific access operation is set in a first specific memory range, and a second specific access operation is set in a second specific memory range that lies within the first specific memory range; wherein the second specific access operation is different from the first specific access operation. Please refer to FIG. 7. As shown in FIG. 7, for the memory 220, the allowable access operation in a memory range RANGE1 is data read or write (RW), the allowable access operation in a memory range RANGE2 is data read (R), and the access operation in memory ranges RANGE3 and RANGE4 are not limited. In order to monitor the operation of the processor 200 according to the above set for the memory ranges of RANGE1-RANGE4, in one embodiment, two monitoring circuits 510 and 512 are used in the memory access controlling apparatus 500. A first access setting value stored in the monitoring circuit 510 is determined to allow the processor 200 to perform a data read or data write (RW) on the memory 220 with a first specific memory range RANGE1 (indicated by RANGE1 (RW) in FIG. 7). More specifically, when the processor 200 performs a data read or data write on the memory 220 within the first specific memory range RANGE1, a corresponding initial watch result MATCH_1 is "1", otherwise it is "0". A second access setting value stored in the monitoring circuit 512 is determined to allow the processor 200 to perform a write (W) on the memory 220 with a second specific memory range RANGE2 (indicated by RANGE2 (W) in FIG. 7). More specifically, when the processor 200 performs a write on the memory 220 within the second specific memory range RANGE2, a corresponding initial watch result MATCH_2 is "1", otherwise it is "0". As shown in FIG. 7, the first specific memory range RANGE1 comprises the second specific memory range RANGE2.

Please refer to the truth tables 32 and 34. Under the condition of the processor 200 performing a data read on the memory 220 within the first specific memory range RANGE1, the logic values of the target watch result XCPN in the first specific memory range RANGE1 are all "1" as the setting value for triggering the exception GI set to be "0". Under the condition of the processor 200 performing a data write on the memory 220 within the first specific memory range RANGE1, the setting value for triggering the exception GI is set to be "0", referred to as the logic values of the target watch result XCPN in the first specific memory range RANGE1 are all "1" apart from the second specific memory range RANGE2. In this embodiment, the setting value for triggering the exception GI is set to be "0", referred to as the target watch result XCPN is "1" and the exception is not triggered while the operation of processor 200 accessing the memory conforms to the access setting value. Thus, if the memory access controlling apparatus 500 is used to monitor the pattern "RW-R-RW" as shown in FIG. 7, the operation of the monitoring circuits 510 and 512 have to be set as described above. On the other hand, the setting value for triggering the exception GI is set to be "1", referred to as the target watch result XCPN is "1" and the exception is triggered while the operation of processor 200 accessing the memory does not conform to the access setting value. Therefore, the user can select the memory access controlling method and decide when to trigger the exception by specifying the setting value for triggering the exception GI.

The memory access controlling apparatus of the present invention takes advantage of a monitoring circuit with a setting unit (e.g., XOR logic gate); thus, there are at least two memory access controlling methods to be selected. In addition, the memory access controlling apparatus of the present invention takes further advantage of a processing circuit (e.g., XOR logic gate) to process the overlap of a plurality of specific memory ranges; thus, the complexity of the circuitry is highly reduced.

Those skilled in the art will readily observe that numerous modifications and alterations of the device and method may be made while retaining the teachings of the invention.

What is claimed is:

1. A memory access controlling apparatus for monitoring an access of a memory to generate a target watch signal, the apparatus comprising:
   at least one monitoring circuit, corresponding to an address of the memory and holding an access setting value, wherein the monitoring circuit monitors the access of the memory according to the access setting value to generate a watch signal;
   a setting unit, holding a setting value for triggering an exception, the setting value for triggering the exception being related to a condition for triggering the exception while the memory is accessed; and an output circuit, coupled to the monitoring circuit and the setting unit, for generating the target watch signal according to the watch signal and the setting value;

wherein the access setting value comprises at least a specific memory range and at least a specific access operation for the memory, and the specific memory range overlaps other specific memory ranges; and wherein when the setting value is a first logic value, the condition for triggering the exception is met when access of the memory complies with an access range and an access operation setting value for triggering the exception; when the setting value is a second logic value, the condition for triggering the exception is met when the access of the memory does not comply with the access range or the access operation setting value.

2. The apparatus of claim 1, wherein the output circuit is a digital logic circuit for performing a predetermined logic operation on a logic value corresponding to the watching signal and the setting value to generate the target watch signal.

3. The apparatus of claim 1, comprising a plurality of monitoring circuits for respectively outputting a plurality of watch signals, and further comprising:
a processing circuit, for performing a predetermined logic operation on the plurality of watch signals to generate a operation signal;
wherein the output circuit generates the target watch signal according to the operation and the setting value.

4. The apparatus of claim 1, wherein the predetermined logic operation is an XOR logic operation.

5. The apparatus of claim 1, wherein the specific access operation is a data read, a data write, an instruction execution, or any combination thereof.

6. A memory access controlling method for monitoring an access of a memory to generate a target watch signal, the method comprising:
monitoring an operation of a processor accessing the memory according to at least an access setting value to generate a watch signal;
providing a setting value for triggering an exception, wherein the setting value is related to a condition for triggering the exception while the memory is accessed; and
generating the target watch signal according to the watch signal and the setting value;
wherein when the setting value is a first logic value, the condition for triggering the exception is met when access of the memory complies with an access range and an access operation setting value for triggering the exception; when the setting value is a second logic value, the condition for triggering the exception is met when the access of the memory does not comply with the access range or the access operation setting value.

7. The method of claim 6, wherein the step of monitoring the operation of the processor accessing the memory comprises outputting a first logic value as the watch signal when the processor accesses the memory in a way complying with the access setting value; otherwise, outputting a second logic value as the watch signal.

8. The method of claim 7, wherein the step of generating the target watch signal according to the watch signal and the setting value comprises:
performing a logic operation on a logic value corresponding to the watch signal and the setting value to generate the target watch signal.

9. The method of claim 7, wherein the step of monitoring the operation of the processor accessing the memory comprises monitoring the processor accessing the memory according to a plurality of access setting values to generate a plurality of watch signals, and the method further comprises:
performing a logic operation on a plurality of logic values corresponding to the plurality of watch signals to generate a operation signal, and generating the target watch signal according to the operation signal and the setting value.

10. The method of claim 9, wherein the logic operation is an XOR logic operation.

11. The method of claim 6, wherein the access setting value comprises a specific memory range and a specific access operation.

12. The method of claim 11, wherein the specific memory range overlaps other specific memory ranges.

13. The method of claim 6, wherein the specific access operation comprises a data reading, a data writing, an instruction execution, and any combination thereof.

14. A memory access controlling apparatus for monitoring an access of a memory to generate a watch signal, the memory access controlling apparatus comprising:
a monitoring unit, comprising:
at least one monitor, holding an access setting value, for monitoring the access of the memory according to the access setting value to generate a watch signal; and
a processing circuit, coupled to the monitor, for performing a logic operation on the watch signal to generate an operation signal;
a mode setting unit, holding an exception setting value, wherein the exception setting value is set according to a condition for triggering an exception while the memory is accessed; and
an output unit, coupled to the monitoring unit and the mode setting unit, for generating the watch signal according to the operation signal and the exception setting value;
wherein when the setting value is a first logic value, the condition for triggering the exception is met when access of the memory complies with an access range and an access operation setting value for triggering the exception; when the setting value is a second logic value, the condition for triggering the exception is met when the access of the memory does not comply with the access range or the access operation setting value.

15. The apparatus of claim 14, wherein the monitor generates a first logic value as the watch signal if access of the memory complies with the access setting value of the monitor; otherwise, the monitor generates a second logic value as the watch signal.

16. The apparatus of claim 14, wherein the access setting value comprises a specific memory range for the memory and a specific access operation corresponding to the specific memory range.

17. The apparatus of claim 16, wherein the specific access operation is a data read, a data write, an instruction execution, or any combination thereof.

18. The apparatus of claim 14, wherein at least one of the output unit and the processing circuit is a digital logic circuit, wherein the digital circuit performs an XOR logic operation.

* * * * *